(12) United States Patent
Witthohn et al.

(10) Patent No.: US 6,472,783 B1
(45) Date of Patent: Oct. 29, 2002

(54) BRUSHLESS, ELECTRONIC COMMUTED MOTOR

(75) Inventors: Lutz Witthohn; Antje Findeisen, both of Oldenburg; Dietrich von Knorre, Hatten; Günter Berg; Dieter Gross, both of Berlin, all of (DE)

(73) Assignee: Temic Automotive Electronic Motors, GmbH, Oldenburg (DE)

( * ) Notice: Subject to any disclaimer, the term of this patent is extended or adjusted under 35 U.S.C. 154(b) by 0 days.

(21) Appl. No.: 09/581,900

(22) PCT Filed: Dec. 5, 1998

(86) PCT No.: PCT/EP98/07917

§ 371 (c)(1),
(2), (4) Date: Aug. 7, 2000

(87) PCT Pub. No.: WO99/33157

PCT Pub. Date: Jul. 1, 1999

(30) Foreign Application Priority Data

Dec. 20, 1997 (DE) .......................... 197 57 136

(51) Int. Cl.$^7$ ........................... H02K 3/28; H02K 21/22; H02K 29/00
(52) U.S. Cl. ..................... 310/68 R; 310/179; 310/180; 310/254; 310/268; 310/DIG. 6
(58) Field of Search ................... 310/179, 180, 310/184, 185, 198, 268, DIG. 6, 254, 68 R

(56) References Cited

U.S. PATENT DOCUMENTS

| | | | | |
|---|---|---|---|---|
| 4,429,240 A | * | 1/1984 | Kishi .......................... 310/45 |
| 4,577,139 A | * | 3/1986 | Reinhardt et al. ......... 310/68 R |
| 4,712,035 A | * | 12/1987 | Forbes et al. ................ 310/269 |
| 4,737,672 A | * | 4/1988 | Kazami ..................... 310/68 R |
| 5,231,324 A | | 7/1993 | Kawamura et al. .......... 310/198 |
| 5,498,919 A | * | 3/1996 | Bahn ........................... 310/268 |
| 5,510,664 A | * | 4/1996 | Suzuki et al. ................ 310/268 |

FOREIGN PATENT DOCUMENTS

| | | |
|---|---|---|
| DE | AS 1613005 | 7/1970 |
| DE | 3638228 A1 | 5/1987 |
| DE | 3542542 A1 | 6/1987 |
| EP | 077312 A3 | 6/1997 |
| EP | 0588448 A3 | 6/1997 |
| JP | 07298544 | 4/1994 |

\* cited by examiner

*Primary Examiner*—Burton S. Mullins
(74) *Attorney, Agent, or Firm*—Venable; Norman N. Kunitz

(57) ABSTRACT

The invention relates to a brushless, electronically commuted motor, more particularly one used as drive motor for a ventilator drive mechanism in an automobile, comprising a permanent magnetic outer rotor (5), in which a stator (7) with three winding wires staggered at 120° el is mounted, in addition to several winding coils for each winding wire. The pitch of the coil of the winding coils (15–37) is s smaller than the pitch of the pole and 0.5 coils are wound per pole and wire (9, 11, 13). A flat, compact, light-weight, silent and efficient EC motor (1) is obtained due to the fact that each winding wire consists of several parallel-connected windings, the outer rotor (5) has at least p=3 pole pairs and a control plate with conductor rails is provided to connect the individual winding coils.

17 Claims, 4 Drawing Sheets

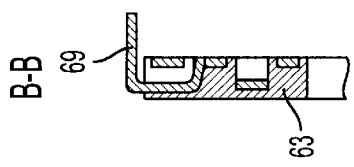
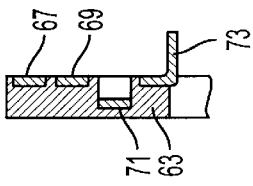
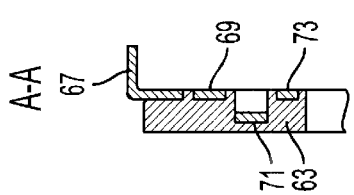
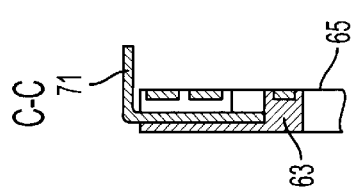
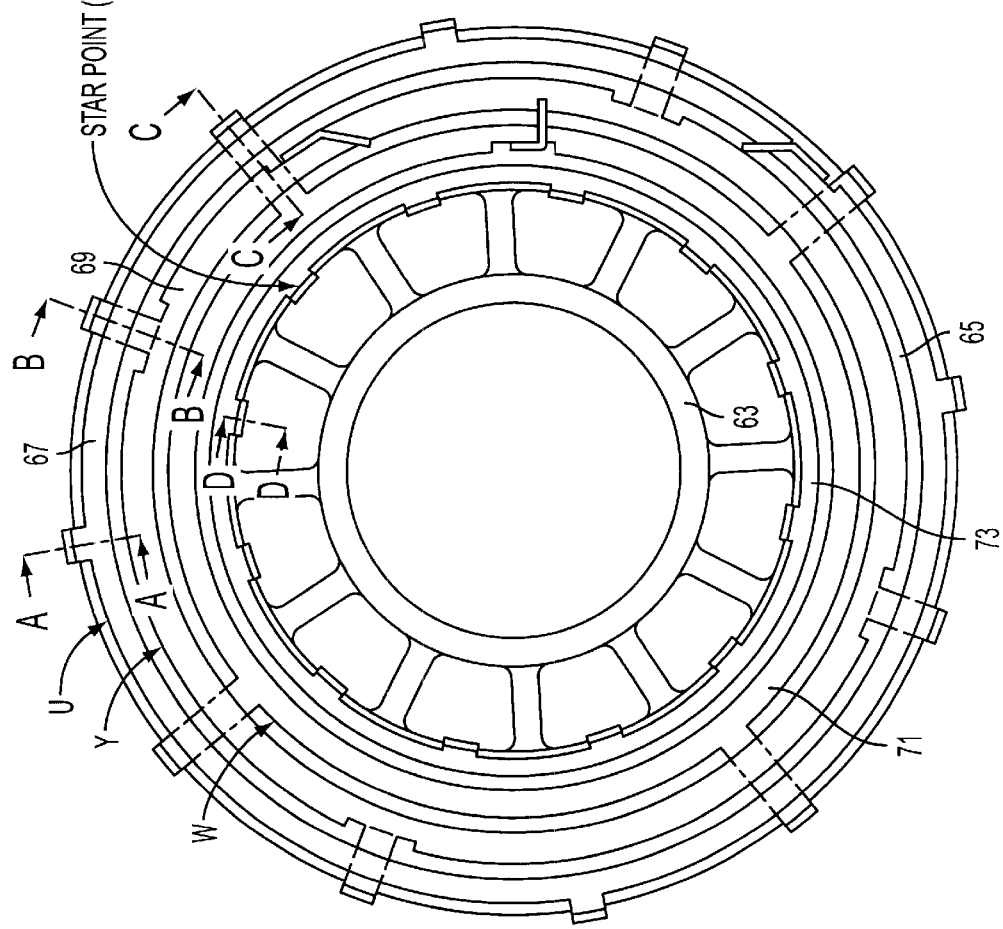

BRUSHLESS, ELECTRONIC COMMUTED MOTOR

BACKGROUND OF THE INVENTION

The invention relates to a brushless, electronically-commutated motor, of the type having a permanent-magnetic outer rotor, in which a stator is disposed, with the stator having three windings or winding stands that are offset by 120° electric from one another, with 0.5 coils being wound per pole and strand, and with each winding strand comprising a plurality of winding coils, whose coil width is smaller than the rotor pole pitch, and which are inserted into winding grooves of the stator.

Electronically-controlled electric motors are gaining prominence in numerous fields of application. These motors are electric motors in which the necessary, periodic switching of coils is no longer performed by a commutator, but by electronic switching devices. The electronic switching devices may include, for example, suitable sensors that determine when the stator and the rotor for the coils to be switched are located in a relative position that facilitates or necessitates switching. Of course, the electronic switching devices must also ensure that current is supplied to the respective coil(s) in the appropriate flow direction.

Electronically-controlled electric motors are already known. In such motors, permanent magnets are used either for the stator poles or the rotor poles. Permanent magnets offer several advantages, such as the absence of current consumption, small dimensions, and simple manufacture and assembly. Electric motors of this type are currently used in many technical fields, e.g., as drive motors for air conditioners or servo devices in motor vehicles. The allotted space for an electrically-operated ventilator for cooling the cooler is notably limited in internal combustion engines that are installed longitudinally with respect to the travel direction of the motor vehicle. Conventional permanent-magnet motors cannot be used because of their large overall axial length.

DE 35 42 542 A1 discloses a disk-memory drive having a drive motor without a commutator, which includes a stator that is provided with a winding, and an outer rotor that has permanent-magnet motor magnets and extends coaxially around the stator, forming an air gap. Because the winding coils are connected in series in each winding strand, a higher current flows through the winding coils. This in turn stipulates a current displacement, which leads to a reduced efficiency. Moreover, this state of the technology includes only two pole pairs, so the higher cogging torques also create more noise.

DE-AS 1 613 005 discloses a DC motor that has no commutator, and has a permanent-magnet rotor with single- or four-pole pairs and a plurality of stationary windings or strands, which can be connected consecutively to a constant DC source by way of a control circuit. The motor shaft is advantageously embodied directly as capstan shaft of a tape recorder; this capstan shaft can be switched to different rpms to attain different tape speeds. The winding coils of this motor are not located in the stator grooves, and are therefore not subjected to a current displacement.

German Published, Non-Examined Patent Application DE 36 38 228 A1 discloses a leg sheet stack for a dynamo-electric machine, and particularly a method for producing a salient-pole motor having an electronically-commuted commutator motor for driving a washing machine. This application discloses a circuit board that is connected to the ends of concentrated windings. These windings are electronically commuted in at least one pre-selected sequence in order to excite the electric motor. In particular, the used circuit board has conductor paths for connecting the individual coils.

SUMMARY OF THE INVENTION

It is the object of the invention to improve a brushless, electronically-commutated motor such that it has an axially flat structure, is simple to produce, is lightweight and has a high level of efficiency. This object generally is accomplished by a brushless, electronically-commutated motor, particularly as a drive motor for a motor-vehicle fan drive, having a permanent-magnetic outer rotor, in which a stator is disposed, the stator having three winding strands that are offset by 120° electric from one another, with one half of a coil being wound per pole and strand, and with each winding strand comprising a plurality of winding coils, whose coil width is smaller than the pole pitch, and which are inserted into winding grooves of the stator; and wherein: each winding strand comprises a plurality of parallel-connected winding coils, the outer rotor has at least p=3 pole pairs; and a circuit board having current conducting bars is provided for connecting the individual winding coils.

Because of its short-pitched windings, the EC motor of the invention has the advantage that the winding heads cannot overlap, which notably effects a small overall axial length.

Because the coils of a winding strand are connected in parallel, the conductor cross section of a winding decreases until a plurality of parallel-connected positions is not necessary inside a winding groove. Each winding therefore has a plurality of parallel current branches. An advantage of the parallel connecting of the coils is the reduction of a current displacement in the winding grooves, as is known from a synchronous rotors. This improves the motor efficiency.

According to a preferred advantageous embodiment of the subject of the invention, the circuit board has four current bars, with one current bar respectively being associated with each of the three winding strands for connecting the beginnings of the parallel-connected winding coils, and the fourth current bar serving to connect the star point to the ends of all of the winding coils of the three winding strands. This feature facilitates the automation of the EC motor production.

Further advantageous embodiments and modifications of the subject of the invention are disclosed.

BRIEF DESCRIPTION OF THE DRAWINGS

FIG. 9 is a plan view of a circuit board having four current bars.

FIGS. 10–13 show details from FIG. 9.

DESCRIPTION OF THE PREFERRED EMBODIMENTS

Figure 1:
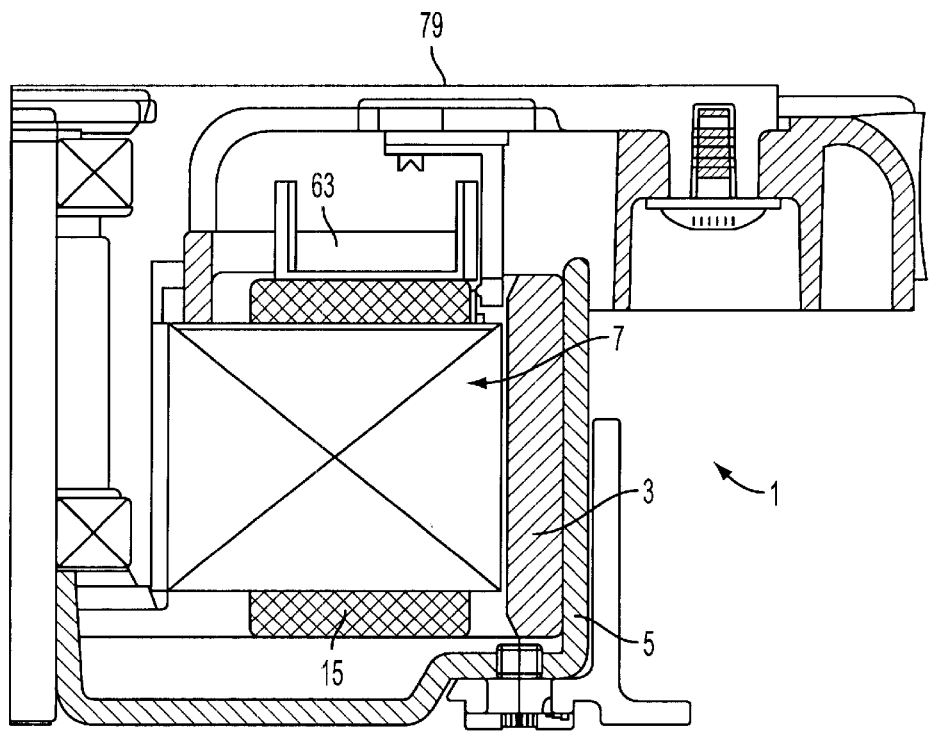
FIG. 1 shows a section through an EC motor.
Figure 7:
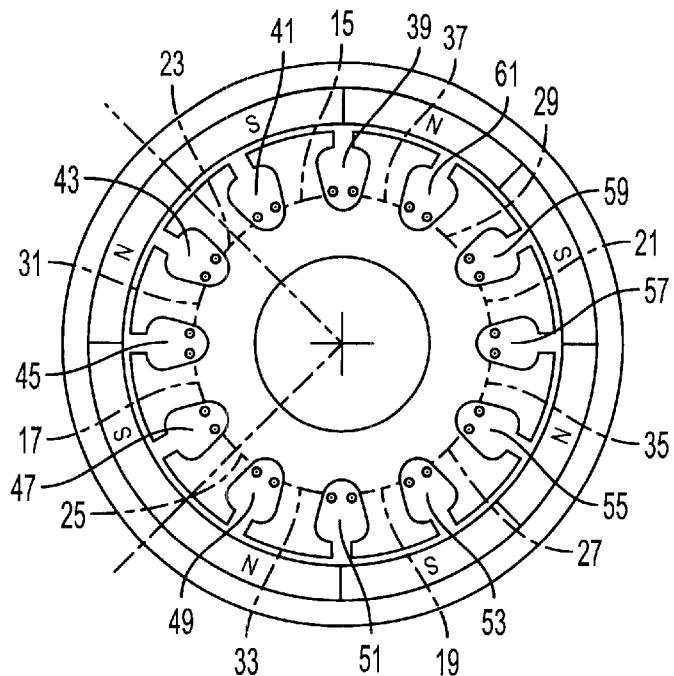
FIG. 7 is a winding diagram of an EC motor having twelve winding grooves.

FIG. 1 shows a partial section through a brushless, electronically-commuted motor, also called an EC motor 1, which notably serves as a drive motor for a motor-vehicle ventilator drive, with an outer rotor 5 that has alternating permanent magnets 3, and with a stator 7, having three winding strands 9, 11, 13 that are offset by 120° from one another, being disposed in the outer rotor 5. According to FIGS. 7 and 8, each winding strand 9, 11, 13 has, for example, four parallel-connected winding coils 15, 17, 19, 21, 23, 25, 27, 29, 31, 33, 35, 37, which are wound in twelve winding grooves 39, 41, 43, 45, 47, 49, 51, 53, 55, 57, 59, 61 of the stator 7. Because the outer rotor 5 has four pole pairs, the coil width of each winding coil 15–37 is smaller than the rotor pole pitch. Furthermore, 0.5 coils are wound per pole and strand. According to FIG. 7, the coil width of the winding coils 15–37 is particularly ⅔ of the rotor pole pitch. This prevents any overlapping of the winding heads of the winding coils 15–37. The low height of the winding heads reduces the overall axial length of the EC motor 1.

Figure 8:
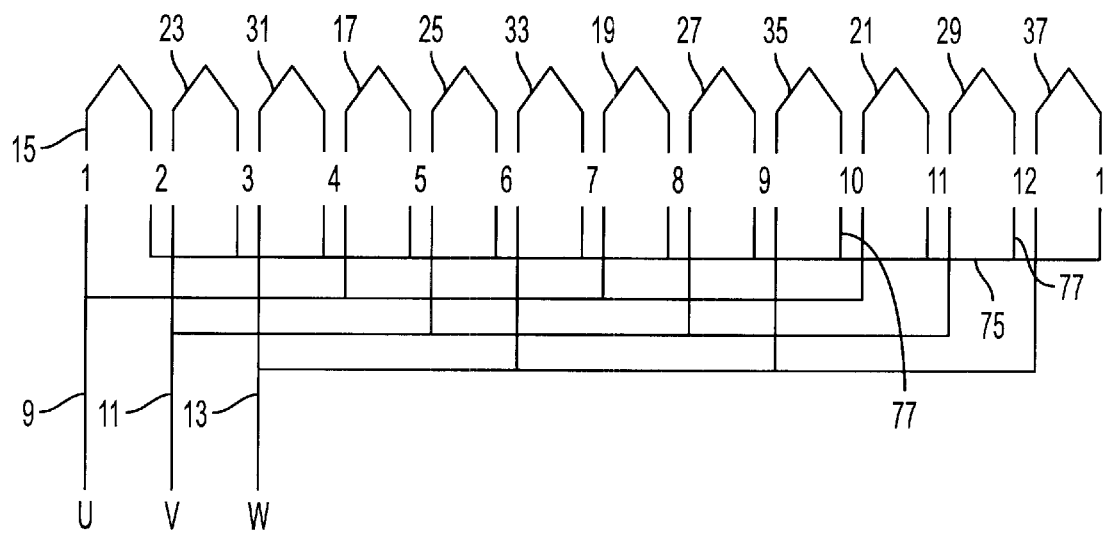
FIG. 8 is a winding diagram for a twelve-groove stator having four current bars.

FIG. 8 shows that each winding 9, 11, 13 comprises, for example, four parallel-connected winding coils 15–37. Within the scope of the invention, the number of parallel-connected winding coils 15–37 corresponds to the number of rotor pole pairs p. Due to the parallel connection of the winding coils 15–37, the wire current is distributed onto a plurality of parallel current branches, which reduces the conductor cross section of a winding wire 9, 11, 13 until a plurality of parallel-connected positions is no longer necessary in a winding groove 39–61. Consequently, a current displacement in the winding grooves 39–61, as is known from asynchronous rotors, is reduced.

According to FIGS. 9–13, a circuit board 63 comprising an insulating material is provided for parallel connection of the winding coils 15–37 of the individual winding strands 9, 11, 13; four current bars 67, 69, 71, 73 are embedded into the board surface 65. In this case, one current bar 67, 69, 71 is respectively associated with each winding wire 9, 11, 13 for connecting the beginnings of the parallel-connected winding coils 15–17. The fourth current bar 73 serves to connect the star point 75 to the ends 77 of all winding coils 15–37 of the three winding strands 9, 11, 13. According to FIG. 1, the circuit board 63 with the four current bars 67, 69, 71, 73, together with the stator 7, is connected to a motor carrier 79, and permits automated production.

Figure 6:
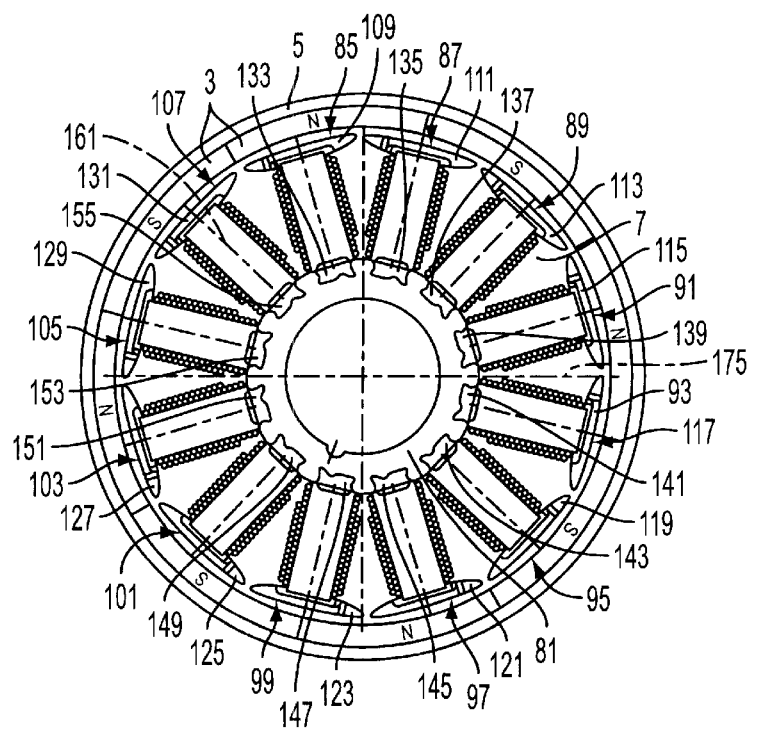
FIG. 6 is a plan view of the stator and rotor.
Figure 2:
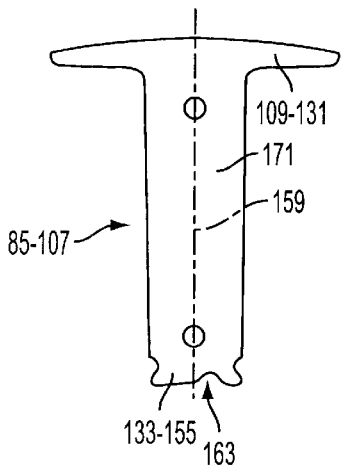
FIG. 2 is a plan view of a stator pole.
Figure 3:
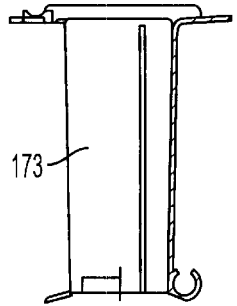
FIG. 3 is a plan view of a coil body.
Figure 5:
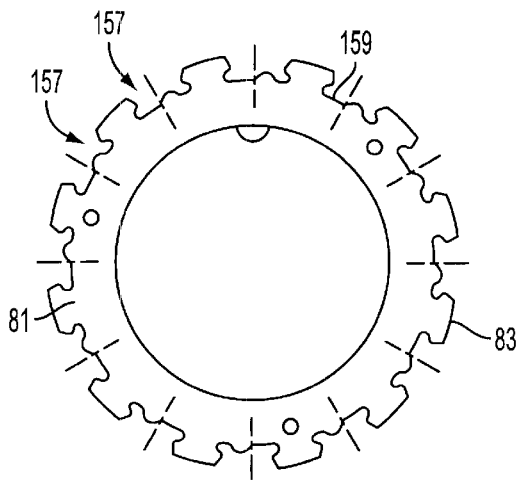
FIG. 5 is a plan view of a magnetic-yoke of the stator.

According to FIGS. 5 and 6, the stator 7 advantageously comprises a hollow-cylindrical magnetic-yoke. part 81 having stator poles 85, 87, 89, 91, 93, 95, 97, 99, 101, 103, 105, 107, which are disposed in the longitudinal direction on the outer circumferential surface 83 of the yoke part 81, and are fixedly connected to the yoke part by means of a compression connection. These stator poles 85–107 and the magnetic-yoke part 81 comprise stamped sheet-steel parts, which are held together by stamping bundling.

The fixed connection between the stator poles 85–107 and the magnetic-yoke part 81 is most simply attained in that the ends of the stator poles 85–107 facing away from the pole teeth 109, 111, 113, 115, 117, 119, 121, 123, 125, 127, 129, 131 are provided with plug-in shoes 133, 135, 137, 139, 141, 143, 145, 147, 149, 151, 153, 155, which can be pressed into guide grooves 157 in the surface 83 of the magnetic-yoke part 81. For this purpose, the plug-in shoes 133–155 of the stator poles 85–107 and the guide grooves 157 in the magnetic-yoke part 81 have a dovetail-like shape.

Figure 4:
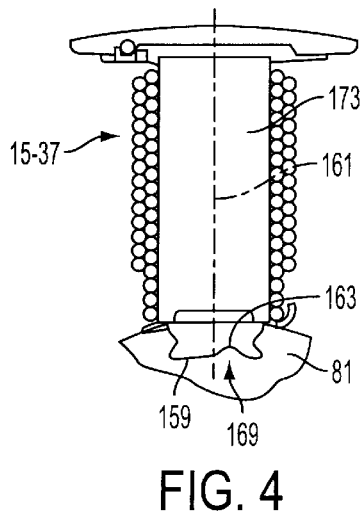
FIG. 4 shows a stator pole having one coil body and one winding.

The pressing of the plug-in shoes 133–155 into the guide grooves 157 of the magnetic-yoke part 81 is facilitated in that, according to FIG. 4, the joining line 159 between the plug-in shoes 133–155 and the guide grooves 157 partially has an air gap. This attains a press fit, only in partial regions, of the plug-in shoes 133–155 in the guide grooves 157, which reduces-the pressing forces and deformation.

The joining line 159 between the stator poles 85–107 and the magnetic-yoke part 81 is asymmetrical with respect to the stator-pole axes 161, so the stator poles 85–107 can only be inserted into the guide grooves 157 of the magnetic-yoke part 81 from one side. This is advantageous with respect to stamping burs that may be present at the stator poles 85–107 and/or the magnetic-yoke part 81.

The asymmetrical arrangement of the joining line 159 is most simply attained in that the plug-in shoes 133–155 of the stator poles 85–107 have depressions 163, which are disposed eccentrically relative to the stator-pole axes 161. When the stator poles 85–107 are pressed into the guide grooves 157 of the magnetic-yoke part 81, the depressions 163 can be inserted with a form fit onto axially-oriented elevations 169 in the guide grooves 157.

The stator poles 85–107 are advantageously not pressed into the guide grooves 157 of the magnetic-yoke part 81 until their pole core 171 is provided with a coil body 173, and the associated stator-winding coil 15–37 is already wound onto this body. It is therefore advantageously possible to attain a layer winding with a high groove-fullness factor. It is also possible to use a smaller groove slot than would be possible in winding through the groove slots. The coil bodies 173 can comprise plastic injection-molded parts that are fixedly disposed on the pole cores 171 of the stator poles 85–107 via the plug-in shoes 133–155.

A further advantage of pressing the stator poles 85–107, with the winding coils 15–37 that are already wound onto the coil bodies 173, into the guide grooves 157 of the magnetic-yoke part 81 is that the spacing slots 175 between the pole teeth 109–131 in the circumferential direction can be kept very narrow. This notably reduces the rotor noise of the EC motor.

The EC motor of the invention is distinguished by a flat axial construction and a low-noise operation, and permits automatic production.

The invention is not limited to the described embodiment. For example, the outer rotor 5 can have a different number of pole pairs, and the stator can have a correspondingly different number of parallel-connected winding coils per winding strand. Furthermore, the EC motor can also be used as a drive motor in fans or other technical devices.

What is claimed is:

1. A brushless, electronically-commuted motor, particularly as a drive motor for a motor-vehicle fan drive, having a permanent-magnetic outer rotor, in which a stator is disposed, the stator having three winding strands that are offset by 120° electrically from one another, with one half of a coil being wound per rotor pole and per strand, and with each winding strand comprising a plurality of winding coils, whose coil width is smaller than the rotor pole pitch, and which are inserted into winding grooves of the stator, and wherein: each winding strand comprises a plurality of parallel-connected winding coils; the outer rotor has at least p=3 pole pairs; and a circuit board having current bars is provided for connecting the individual winding coils with the circuit board having four current bars, with one current bar respectively being associated with each of the three winding strands for connecting the beginnings of the parallel-connected winding coils, and the fourth current bar serving to connect the star point to the ends of all of the winding coils of the three winding strands.

2. The motor according to claim 1, wherein each winding strand comprises four parallel-connected winding coils.

3. The motor according to claim 1, wherein the coil width of each winding coil equals ⅔ of the rotor pole pitch.

4. The motor according to claim 1, wherein a coil side of two different winding strands is disposed in each winding groove.

5. The motor according to claim 1, wherein the stator comprises a hollow-cylindrical magnetic-yoke having stator poles, which are disposed in the longitudinal direction on the outer circumferential surface of the yoke, and are fixedly connected to the yoke by a compression connection.

6. The motor according to claim 5, wherein the stator poles and the magnetic-yoke comprise stamped sheet-steel parts.

7. The motor according to claim 6, wherein the ends of the stator poles facing away from the rotor are provided with plug-in shoes, which are pressed into guide grooves in the surface of the magnetic-yoke.

8. The motor according to claim 7, wherein the plug-in shoes of the stator poles and the guide grooves have a dovetail-like shape.

9. The motor according to claim 8, wherein the joining line between the plug-in shoes and the guide grooves partially has an air gap, so that the plug in shoes form a press fit only in partial regions in the guide grooves.

10. The motor according to claim 9, wherein the joining line between the stator poles and the magnetic-yoke is asymmetrical with respect to the stator-pole axis.

11. The motor according to claim 10, wherein the plug-in shoes of the stator poles have depressions, which are disposed eccentrically relative to the stator-pole axes, and, when the stator poles are pressed into the guide grooves of the magnetic-yoke, are inserted with a form fit onto axially-oriented elevations in the guide grooves.

12. The motor according to claim 1, wherein coil bodies for the stator windings are disposed on pole cores of the stator poles, and the stator windings are wound with the magnetic-yoke, onto the coil bodies prior to the joining of the stator poles to the magnetic-yoke part.

13. The motor according to claim 12, wherein the coil bodies comprise plastic injection-molded parts, which are pushed onto the pole cores of the stator poles over the plug-in shoes.

14. The motor according to claim 12, wherein the coil bodies are fixedly disposed on the pole cores of the stator poles.

15. The motor according to claim 1, the rotor has four pole pairs, and each winding strand has four parallel-connected winding coils for a twelve-groove stator.

16. A brushless, electronically-commuted motor, particularly as a drive motor for a motor-vehicle fan drive, having a permanent-magnetic outer rotor, in which a stator is disposed, the stator having three winding strands that are offset by 120° electrically from one another, with one half of a coil being wound per rotor pole and per strand, and with each winding strand comprising a plurality of winding coils, whose coil width is smaller than the rotor pole pitch, and which are inserted into winding grooves of the stator, and wherein: each winding strand comprises a plurality of parallel-connected winding coils; the outer rotor has at least p=3 pole pairs; a circuit board having current bars is provided for connecting the individual winding coils; the stator comprises a hollow-cylindrical magnetic-yoke having stator poles, which are disposed in the longitudinal direction on the outer circumferential surface of the yoke, and are fixedly connected to the yoke by a compression connection; the stator poles and the magnetic-yoke comprise stamped sheet-steel parts; the ends of the stator poles facing away from the rotor are provided with plug-in shoes, which are pressed into guide grooves in the surface of the magnetic-yoke; the plug-in shoes of the stator poles and the guide grooves have a dovetail-like shape; the joining line between the plug-in shoes and the guide grooves partially has an air gap, so that the plug-in shoes form a press fit only in partial regions in the guide grooves; and, the joining line between the stator poles and the magnetic-yoke is asymmetrical with respect to the stator-pole axis.

17. The motor according to claim 16, wherein the plug-in shoes of the stator poles have depressions, which are disposed eccentrically relative to the stator-pole axes, and, when the stator poles are pressed into the guide grooves of the magnetic-yoke, are inserted with a form fit onto axially-oriented elevations in the guide grooves.

* * * * *